United States Patent [19]

Scholz et al.

[11] Patent Number: 4,620,721
[45] Date of Patent: Nov. 4, 1986

[54] AUTOMATIC PASSENGER SAFETY SYSTEM

[75] Inventors: Hansjürgen Scholz, Waldenbuch; Luigi Brambilla, Boblingen; Walter Jahn, Ehningen, all of Fed. Rep. of Germany

[73] Assignee: Daimler-Benz Aktiengesellschaft, Fed. Rep. of Germany

[21] Appl. No.: 722,662

[22] Filed: Apr. 12, 1985

[30] Foreign Application Priority Data

Apr. 12, 1984 [DE] Fed. Rep. of Germany ....... 3413768

[51] Int. Cl.⁴ .............................................. B60R 21/32
[52] U.S. Cl. .................................... 280/735; 280/801; 180/268
[58] Field of Search ............... 280/735, 728, 734, 801; 180/268, 282

[56] References Cited

U.S. PATENT DOCUMENTS 3,766,612 10/1973 Hattori .............................. 180/268
4,243,248 1/1981 Scholz ................................ 280/735

Primary Examiner—John J. Love
Assistant Examiner—Karin L. Ferriter
Attorney, Agent, or Firm—Barnes & Thornburg

[57] ABSTRACT

A passive restraining system for an automobile provides a means, in the event of an automobile accident, for inflating an air bag system on the driver's side at a lower threshold speed if the driver is not wearing a seat belt, and at a higher threshold speed if the driver is wearing a seat belt. This system, however, allows a second air bag system to inflate for protecting the front seat passenger in the event of an accident, at the lower threshold speed, regardless of whether the passenger is wearing a seat belt or not.

19 Claims, 2 Drawing Figures

AUTOMATIC PASSENGER SAFETY SYSTEM

BACKGROUND AND SUMMARY OF THE INVENTION

This invention relates in general to a passive restraining system for occupants of a vehicle and, in particular to a restraining system using air bags for protecting the front seat occupants of a vehicle in a low speed collision.

In German Publication DE-OS No. 27 45 620, a restraining system is known for having air bags for the driver and the front seat passenger which are inflatable in the event of a collision. The air bags are inflated in a controlled manner by output signals of a sensor system which are based upon the change in speed of a vehicle. In the event of an accident, the air bag on the passenger side can be inflated when the vehicle speed is within a first lower threshold value S1, corresponding to an equivalent test speed of between 7.5 and 11.2 mph (12 and 18 kph). The air bag on the driver side, however, cannot be inflated unless the vehicle speed is within a second higher threshold value S2, corresponding to an equivalent test speed of between 11.2 and 15.5 mph (18 and 25 kph). Thus, in accidents occurring at speeds at the first lower threshold value, only the passenger of the vehicle and not the driver, is protected by the air bag system.

Using seat belts, with or without belt tighteners, in combination with an air bag restraining system, provides the occupants in the front seat of the vehicle with a high degree of passive safety, particularly in accidents involving head-on collisions. According to the known art, however, should the occupants not use their seat belts, only the passenger will still have the supplemental protection of the air bag system in accidents occurring at speeds corresponding to the first lower threshold value S1. Because the driver's air bag is activated only if the higher threshold value S2 is reached, the driver is subjected to a significantly greater risk of injury than is the passenger, particularly when the driver's seat belt is not fastened, despite the existing air bag system. It would, therefore, be useful to let the air bag system trigger for the driver's side at speeds corresponding to the lower threshold value (S1), when the driver is not wearing a seat belt.

It is, therefore, an object of this invention to provide a passsive restraining system which allows triggering of an air bag system at either a first lower threshold value or a second higher threshold value as a function of whether the seat belts have been fastened or not.

It is further an object to provide a restraining system whereby even if the seat belt is not fastened, the driver as well as the passenger is protected by the air bag system at a low speed collision.

The above and other objects are attained by a passive restraining system of a vehicle which protects both the driver and front seat passenger in low speed collisions with the system comprising of an air bag system, a sensor, and a switching means. When the sensor detects a sudden change in the vehicle's speed as a result of an accident, it provides one of two output signals to the air bag system via a switching means. A first output signal is emitted when the vehicle speed had reached a first lower threshold value (S1), and a second output signal is emitted when the vehicle speed has reached a second higher threshold value (S2). The switching means determines which sensor signal is provided to the air bag system based upon whether the driver has fastened his seat belt or not. If he has not fastened it, the switching means provides a connection between the sensor's first output signal and the air bag system. If the driver has fastened his seat belt, the switching means then provides a connection between the sensor's second output signal and the air bag sytem. A switching means for detecting when a seat belt is fastened or not can be provided for any seat equipped with a passive restraining system.

Other objects, advantages and novel features of the present invention will become apparent from the following detailed description of the invention when considered in conjunction with the accompanying drawing.

DETAILED DESCRIPTION OF THE DRAWINGS

Figure 1:
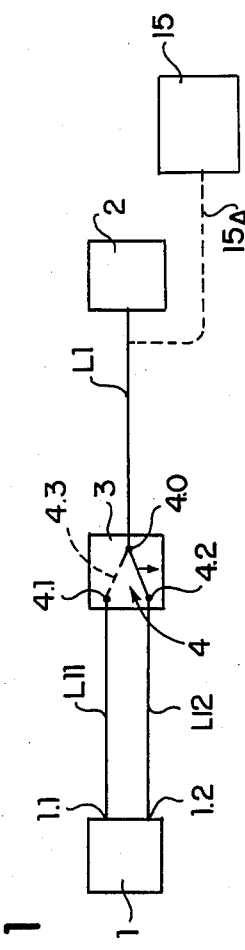
FIG. 1 is a schematic diagram according to a first embodiment of the invention.

The sensor 1 shown in FIG. 1, includes an acceleration sensor having two threshold value switches which provide one of two threshold signals, depending upon the speed of the vehicle. The sensor further includes a means for generating a voltage which can trigger the inflating devices of a restraining system (2) in the event of an accident. The inflating device on the driver's side of a vehicle, may consist of an air bag built into the steering wheel. A switching element 4 which may be built into the seat belt clasp 3 on the driver's side, performs as a reversing switch. A joint switching contact 4.0 within the switching element 4, is connected to the air bag system 2 by a control line L1. A seat belt tightener 15 may also be included with a seat belt, shown schematically connected to control line L1 via line 15A. A first change over contact 4.1 is connected to the first threshold value switch at the output 1.1 of the sensor by a control line L11, with a second change-over control 4.2 being connected to the second threshold value switch at the output 1.2 of the sensor 1 by the control line L12. When the driver has not fastened his seat belt, the switching finger 4.3 of the switching element 4 is in the position shown by an interrupted line in the drawing. This connects the control line L11 to the control line L1, thereby connecting the first threshold value switch to the air bag device, so that if the first threshold value S1 is reached, an output signal located at the output 1.1 of the sensor provides the triggering voltage to an inflating device in the air bag system 2. By integrating the belt clasp switching element into the passive restraining system, the inflatable device on the driver's side will respond at the lower threshold value (S1) when the driver is not wearing his seat belt. When the driver' seat belt is fastened properly, the switching finger 4.3 will connect the control lines L12 to L1, thereby connecting the second threshold value switch to the restraining system. This results in a triggering voltage being supplied at the output 1.2 of the sensor to the driver's inflating device only when the second threshold value S2 has been reached.

Figure 2:
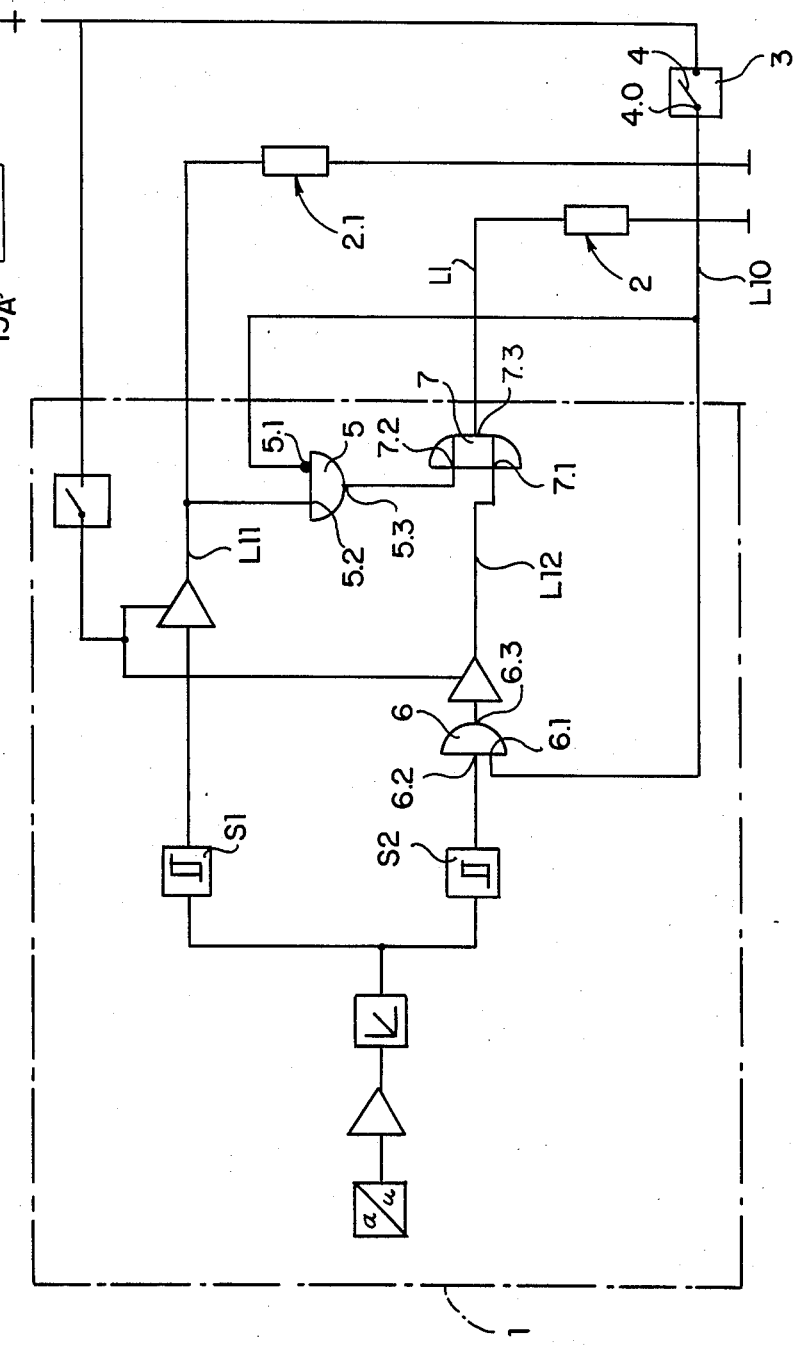
FIG. 2 is a schematic diagram of a logic circuit including the switching element according to another embodiment.

In the embodiment of the invention shown in FIG. 2, the switching element 4 including a switching contact 4.0 is part of a logic circuit. The switching contact 4.0 connects to both an inverting input 5.1 of a first AND-gate 5 and to a noninverting input 6.1 of a second AND-gate 6, by a control line L10. A second threshold value switch S2 of the sensor 1 is connected to the other noninverting input 6.2 of the second AND-gate 6. A first threshold value switch S1 of the sensor 1 is connected to the second input 5.2 of the first AND-gate 5 by the control line L11. The output 5.3 of the AND-gate 5 connects to one of the inputs 7.2 of an OR-gate 7. At the other input 7.1 of the OR-gate 7 is connected the output of the second AND-gate 6.3 by control line L12. The output 7.3 of the OR-gate 7 is connected to the leads of the air bag system 2 located on the driver's side, by the control line L1. In addition, the control line L11 also leads to a second air bag system 2.1 which is arranged on the side of the front seat passenger. When the driver has not fastened his seat belt, the switching element 4 is opened, and a "1"-signal is supplied to the AND-gate 5 through the inverting input 5.1. Additionally, when the first threshold value S1 is reached, a "1"-signal is supplied to the AND-gate 5 through the non-inverting input 5.2, thereby producing a "1" signal at the output 5.3 of the AND-gate 5. This "1" signal is then supplied to the OR-gate 7 through the input 7.2. This results in a "1"-signal appearing at the output 7.3 of the OR-gate 7, which activates the inflating device of the air bag system 2 located on the driver's side. The "1"-signal supplied to the AND-gate 5 by the first threshold value switch S1 is also supplied to the air bag system 2.1 on the side of tne front passenger, thereby activating it at the same time the air bag system 2 is activated.

When, the driver has fastened his seat belt, the switching contact 4.0 of the switching element 4 is closed, and a "0"-signal is supplied to the AND-gate 5 through inverting input 5.1, causing the output 5.3 of the AND-gate 5 to be a "0" signal. If second threshold value switch S2 has not been reached, a "0" signal will also be at the input 7.2 of OR-gate 7 as well. As a result of switching contact 4 being closed, "1"-signal is supplied to the AND-gate 6 through the input 6.1. When, in the case of an accident, the first threshold value S1 is reached, the front passenger air bag system 2.1 is activated via the control line L11. But air bag system 2 on the driver's side is not activated because of the "0"-signal located at the input 5.1 of the AND-gate 5. If the threshold value S2, however, is reached during the accident, a "1"-signal will be supplied to the second input 6.2 of the AND-gate 6 by S2, thereby providing a "1" signal at output 6.3 of the AND-gate 6 and thus at the input 7.1 of the OR-gate 7. A "1"-signal thereby results at the output 7.3 of the OR-gate 7 and will thus activate the air bag system 2 on the driver's side in concurrence with the activation of the system on the passenger's side.

This embodiment, therefore, also protects the driver with the best possible effect when the accident speeds are low and the driver has not fastened the seat belt.

From the preceeding description of the preferred embodiments, it is evident that the objects of the invention are attained, and although the invention has been described and illustrated in detail, it is to be understood that the same is by way of illustration and example only and is not to be taken by way of limitation. The spirit and scope of the invention are to be limited only the terms of the appended claims.

We claim:

1. Vehicle passenger restraint system comprising:

deceleration sensor means including means for providing a first output signal during sudden deceleration of a vehicle when said vehicle is traveling at a first threshold velocity range, and
   a second output signal during sudden deceleration of a vehicle when said vehicle is traveling at a second threshold velocity range;
   seat belt condition sensor means including means for providing a first seat belt signal indicating the seat belt is unfastened, and a second seat belt signal indicating the seat belt is fastened; and
   control means for providing an air bag inflation signal to a vehicle air bag system upon receiving said first seat belt signal and said first output signal or said second seat belt signal and said second output signal.

2. The system according to claim 1, further including a seat belt.

3. The system according to claim 1, further including an air bag system.

4. A passive restraining system according to claim 3, wherein said air bag system is built into the steering wheel of said vehicle.

5. A passive restraining system according to claim 3, wherein the control means is built into a seat belt clasp on the driver's side.

6. A passive restraining system according to claim 3, wherein said control means is a reversing switch, said reversing switch including a joint switching contact which is connected to said air bag system by a control line, said reversing switch further including a first change—over contact being connected to a first lower threshold value switch by control line, and a second change—over contact being connected with a second threshold value switch of said sensor means by a control line.

7. A passive restraining system according to claim 3, wherein said sensor means includes a lower threshold output and a higher threshold output for providing said first and second output signals respectively, said control means further including a logic means for interconnecting said threshold outputs of said sensor means to said air bag system.

8. A passive restraining system according to claim 7, wherein said logic means include a control line connecting said control means to both an inverting input of a first AND-gate and a noninverting input of a second AND-gate, said logic circuit further including a control line leading from a said higher threshold output of said sensor means to said air bag system, and a control line leading from said lower threshold output of said sensor to an input of the first AND-gate, the output of said first AND-gate being connected to an input of an OR-gate the output of said OR-gate being connected to said air bag system by a control line.

9. A passive restraining system according to claim 3, wherein said air bag system further includes a second air bag, positioned in the proximity of a non-driving occupant in the front seat of the vehicle, wherein said second air bag is activated by said first output signal of said sensor means.

10. A passive restraining system according to claim 3, wherein said air bag system further includes at least one belt tightener.

11. A passive restraining system for protecting occupants of a motor vehicle having seat belts, when said vehicle suddenly decelerates as a result of an accident, said restraining system comprising:

sensor means for sensing deceleration of said vehicle and for providing a first output signal at a lower threshold velocity and a second output signal at a higher threshold velocity;

switching means for providing a signal corresponding to whether said occupant's seat belt is fastened or not;

controlling means interconnecting said sensor means and said switching means to an air bag system, for providing a signal to said air bag system which is a function of said first and second output signals and also the fastening of said seat belt;

said air bag system being activated by said controlling means.

12. A passive restraining system according to claim 11, wherein said switching means is built into the seat belt clasp on the driver's side.

13. A passive restraining system according to claim 11, wherein said air bag system is built into the steering wheel of said vehicle.

14. A passive restraining system according to claim 11, wherein said controlling means includes a first output port for providing said first output signal of said sensor and a second output port for providing said second output signal of said sensor.

15. A passive restraining system according to claim 14, wherein said switching means is a reversing switch having a joint switching contact, with a first change-over contact being connected to said first port of said controlling means and, a second change-over contact connected to said second port of said controlling means, wherein said switching means further includes a switching finger which connects one of said ports to said bag system.

16. A passive restraining system according to claim 11, wherein said controlling means triggers said air bag system when both said signal from said switching means corresponds to said seat belt being unfastened and said signal from said sensor means corresponds to said lower threshold velocity, said controlling means also triggering said air bag system when both said signal from said switching means corresponds to the said seat belt being fastened and said signal from said sensor means corresponds to said higher threshold velocity.

17. A passive restraining system according to claim 16, wherein said controlling means include a control line connecting said switching means to both an inverting input of a first AND-gate and a noninverting input of a second AND-gate, said controlling means further including a control line leading from a said higher threshold output of said sensor means to said air bag system, and a control line leading from said lower threshold output of said sensor to an input of the first AND-gate, the output of said first AND-gate being connected to an input of an OR-gate the output of said OR-gate being connected to said air bag system by a control line.

18. A passive restraining system according to claim 11, wherein said air bag system further includes a second air bag, positioned in the proximity of a non-driving occupant in the front seat of the vehicle, wherein said second air bag is activated by said first output signal of said sensor means.

19. A passive restraining system according to claim 11, wherein said air bag system further includes at least one belt tightener.

* * * * *